United States Patent
Park

(10) Patent No.: US 9,656,557 B2
(45) Date of Patent: May 23, 2017

(54) BATTERY CHARGING APPARATUS AND METHOD OF ELECTRIC VEHICLE

(71) Applicant: Hyundai Motor Company, Seoul (KR)

(72) Inventor: Hyun Soo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 14/715,786

(22) Filed: May 19, 2015

(65) Prior Publication Data

US 2016/0144731 A1 May 26, 2016

(30) Foreign Application Priority Data

Nov. 25, 2014 (KR) ........................ 10-2014-0165615

(51) Int. Cl.
*H02J 7/00* (2006.01)
*B60L 11/18* (2006.01)

(52) U.S. Cl.
CPC ..... *B60L 11/1809* (2013.01); *B60L 2240/486* (2013.01); *H02J 7/007* (2013.01); *Y02T 10/7005* (2013.01); *Y02T 10/7077* (2013.01)

(58) Field of Classification Search
CPC ........... B60L 11/1809; B60L 2240/486; Y02T 10/7005; Y02T 10/7077
See application file for complete search history.

(56) References Cited

U.S. PATENT DOCUMENTS

| | | | | |
|---|---|---|---|---|
| 5,869,950 A | * | 2/1999 | Hoffman, Jr. | B60K 6/28 320/103 |
| 6,784,563 B2 | * | 8/2004 | Nada | F02N 11/0859 180/65.235 |
| 6,826,365 B1 | * | 11/2004 | Constable | G03B 15/05 396/206 |
| 8,531,053 B2 | * | 9/2013 | Choi | B60K 6/48 180/65.265 |
| 8,564,241 B2 | * | 10/2013 | Masuda | H02J 7/1453 320/104 |
| 2005/0285564 A1 | * | 12/2005 | Mathews | B60L 11/1861 320/116 |
| 2009/0260903 A1 | * | 10/2009 | Park | B60W 10/06 180/65.21 |
| 2012/0041630 A1 | * | 2/2012 | Yamamoto | B60K 6/445 701/22 |
| 2013/0030621 A1 | * | 1/2013 | Chung | B60L 3/04 701/22 |
| 2013/0138286 A1 | * | 5/2013 | Sawayama | B60W 10/06 701/22 |

(Continued)

FOREIGN PATENT DOCUMENTS

JP 2008-098098 A 4/2008
JP 2010-093969 A 4/2010
(Continued)

*Primary Examiner* — Helen Rossoshek
(74) *Attorney, Agent, or Firm* — Mintz Levin Cohn Ferris Glovsky and Popeo, P.C.; Peter F. Corless

(57) ABSTRACT

A battery charging apparatus and method of an electric vehicle are provided. The battery charging apparatus includes a temperature sensor that is configured to sense a temperature of a battery. In addition, a controller is configured to discharge the battery and then charge the battery using any one of a low voltage converter and a motor based on the temperature.

8 Claims, 2 Drawing Sheets

(56) References Cited

U.S. PATENT DOCUMENTS

| | | | |
|---|---|---|---|
| 2013/0253748 A1* | 9/2013 | Kiuchi | B60K 6/48 701/22 |
| 2014/0167680 A1* | 6/2014 | Park | H02J 7/0054 320/104 |
| 2014/0172214 A1* | 6/2014 | Kim | B60W 20/10 701/22 |
| 2014/0306668 A1* | 10/2014 | Lee | B60L 11/1838 320/152 |
| 2015/0061605 A1* | 3/2015 | Yamazaki | B60L 1/003 320/150 |
| 2016/0121725 A1* | 5/2016 | Shin | B60L 7/16 701/22 |
| 2016/0172872 A1* | 6/2016 | Chang | H02J 7/007 320/167 |
| 2016/0280204 A1* | 9/2016 | Lian | B60W 20/12 |
| 2016/0303976 A1* | 10/2016 | Cha | B60L 3/0046 |
| 2016/0368480 A1* | 12/2016 | Shin | B60W 20/14 |

FOREIGN PATENT DOCUMENTS

| | | |
|---|---|---|
| JP | 2010-200570 A | 9/2010 |
| JP | 2013-198372 A | 9/2013 |
| KR | 2004-0031196 A | 4/2004 |
| KR | 2012-0076954 A | 7/2012 |

\* cited by examiner

BATTERY CHARGING APPARATUS AND METHOD OF ELECTRIC VEHICLE

CROSS-REFERENCE TO RELATED APPLICATION

This application is based on and claims the benefit of priority to Korean Patent Application No. 10-2014-0165615, filed on Nov. 25, 2014 in the Korean Intellectual Property Office, the disclosure of which is incorporated herein in its entirety by reference.

TECHNICAL FIELD

The present disclosure relates to a battery charging apparatus and method of an electric vehicle, and more particularly, to a battery charging apparatus and method of an electric vehicle that improve marketability of the electric vehicle by reducing a charging time of a battery during low-temperature charging.

BACKGROUND

Generally, a hybrid electric vehicle is configured to control an electric motor using a high-voltage, high-capacity battery to perform a motor driving control of a battery using energy discharge of the battery such as starting of a vehicle, adding a starting torque when starting the vehicle, an engine assist while driving, an engine stop when stopping the vehicle, and re-starting after an idle stop and a motor power generation control such as power generation while stopping and power generation while driving, thereby charging energy in the battery.

The hybrid electric vehicle includes a control device called a battery management system (BMS) configured to operate and manage a battery and operate the control device (e.g., a controller). The BMS may mainly be configured to monitor voltage, current, temperature, and the like of the battery, calculate and output a state of charge (SOC) of the battery, and measure and display the state of charge of the battery, error information, and the like. Further, the BMS may be configured to perform cell balancing, cooling, supply voltage, and current limitation, and the like of the battery. However, to improve lifespan of the battery and performance of the vehicle, the BMS does not generally perform the charging of the battery when the battery is a low temperature state.

SUMMARY

The present disclosure provides a battery charging apparatus and method of an electric vehicle that may reduce a charging time of a battery during low-temperature charging.

According to an exemplary embodiment of the present disclosure, a battery charging apparatus of electric vehicle may include: a temperature sensor configured to sense a temperature of a battery; and a controller configured to discharge the battery and then charge the battery using any one of a low voltage converter and a motor based on the temperature.

The controller may be configured to discharge the battery using the low voltage converter when the temperature of the battery ranges from a first threshold temperature to a second threshold temperature. The controller may also be configured to discharge the battery using the motor when the temperature of the battery is equal to or less than the first threshold temperature. Further, the controller may be configured to charge the battery when a discharging time of the battery exceeds a threshold time and charge the battery when the discharging of the battery is completed.

According to another exemplary embodiment of the present disclosure, a battery charging method of electric vehicle may include: confirming a temperature of a battery mounted within a vehicle; discharging the battery using any one of a low voltage converter and a motor based on the temperature; and charging the battery. The discharging of the battery may include discharging of the battery using the low voltage converter when the temperature of the battery ranges from a first threshold temperature to a second threshold temperature. The discharging of the battery may also include discharging of the battery using the motor when the temperature of the battery is equal to or less than the first threshold temperature.

Further, the charging of the battery may include confirming a discharging time of the battery and charging the battery when the discharging time of the battery exceeds a threshold time. The charging of the battery may also include confirming a discharging completion of the battery and charging the battery when the discharging completion of the battery is confirmed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
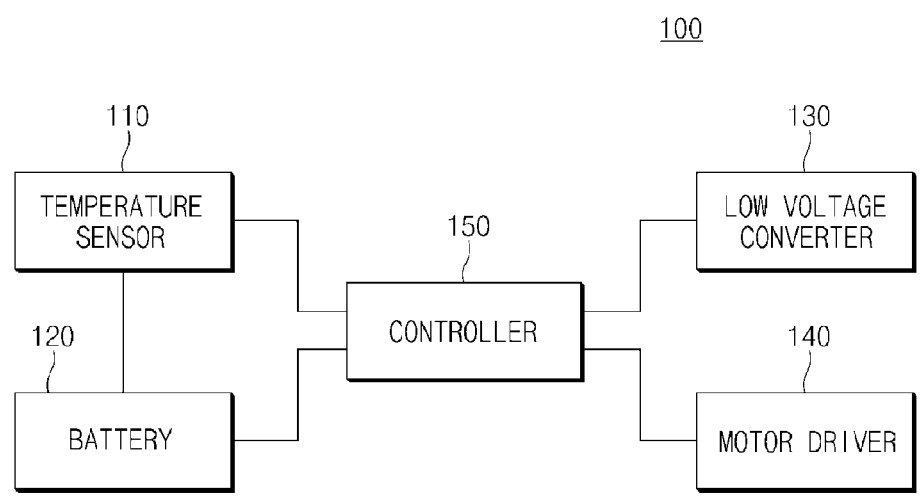
FIG. 1 is an exemplary block diagram illustrating main components of a battery charging apparatus of electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, various exemplary embodiments of the present disclosure will be described with reference to the accompanying drawings. The exemplary embodiments of the present disclosure may be variously changed and variously practiced, but specific exemplary embodiments are illustrated in the accompanying drawings and detailed contents thereof will be described. However, it is to be understood that various exemplary embodiments of the present disclosure are not limited to the specific exemplary embodiments, but include all modifications, equivalents, and substitutions included in the spirit and the scope of the present disclosure. In describing the drawings, like components are denoted by like reference numerals.

FIG. 1 is an exemplary block diagram illustrating main components of a battery charging apparatus of electric vehicle according to an exemplary embodiment of the present disclosure. Referring to FIG. 1, a battery charging apparatus 100 according to an exemplary embodiment of the present disclosure may include a temperature sensor 110, a battery 120, a low voltage converter 130, a motor driver 140, and a controller 150. The controller 150 may be configured to operate the various components of the battery charging apparatus 100. The temperature sensor 110 may be configured to measure the temperature of the battery 120 and provide the measured result to the controller 150. The battery 120 may be configured to supply main power for driving an electric vehicle. Accordingly, the to battery 120 may be charged by the operation of the controller 150.

The low voltage converter 130 which may be a low direct current-direct current (DC/DC) converter may be configured to switch general DC into alternating current (AC), boost or buck the AC using a coil, trans, capacitance, and the like, and then again rectify the boosted or bucked AC to convert to the DC, to thus supply electricity to reach a voltage used in each electric field load. The low voltage converter 130 may further be configured to discharge the battery 120. The motor driver 140 may be configured to drive (e.g., operate) predetermined apparatuses in an electric vehicle, for example, a compressor (not illustrated) that produces an air pressure and an air conditioner system, and other hydraulic systems by power applied from the battery 120 and the operation of the controller 150 and may be configured to discharge the battery 120 by an operation of the motor (not illustrated).

The controller 150 may be configured to sense a starting of the vehicle (e.g., when the vehicle is being turned on). When the vehicle starts, the controller 150 may be configured to confirm the temperature of the battery 120 sensed by the temperature sensor 110. According to the exemplary embodiment of the present disclosure, the controller 150 may be configured to charge the battery 120 when the temperature of the battery 120 ranges from a first threshold temperature, for example, about $-10°$ C. to a second threshold temperature, for example, about $0°$ C. The controller 150 may be configured to confirm the temperature of the battery 120 in real time or periodically while the battery 120 is being charged. The controller 150 may then be configured to discharge the battery 120 by operating the low voltage converter 130 when the temperature of the battery 120 which is charging is about room temperature. The controller 150 may be configured to generate a command to adjust a charging current of the battery 120 to about 0 A and provide the generated command to a charger (not illustrated) and the charger may then be configured to temporarily stop the charging of the battery 120. As a result, the low voltage converter 130 may be configured to discharge the battery 120 due to the electric field load.

For convenience of explanation, the present specification describes that the first threshold temperature and the second threshold temperature each are about $-10°$ C. and $0°$ C., but are not necessarily limited thereto. It is to be noted that the first threshold temperature and the second threshold temperature may be changed based on a type and a state of the battery. Further, the controller 150 may be configured to charge the battery 120 again in response to confirming that the discharging of the battery 120 is completed by the low voltage converter 130 or the discharging time of the battery 120 exceeds the threshold time. In particular, the discharging time may be the time when the falling of SOC by the low voltage converter 130 is less than about 1%.

According to the exemplary embodiment of the present disclosure, the controller 150 may be configured to charge the battery 120 when the temperature of the battery 120 is equal to or less than the first threshold temperature, for example, about $-10°$ C. Particularly, the controller 150 may be configured to confirm the temperature of the battery 120 in real time or periodically while the battery 120 is being charged. The controller 150 may be configured to discharge the battery 120 using the motor (not illustrated) by operating the motor driver 140 when the temperature of the battery 120 which is charging is about room temperature. The controller 150 may then be configured to generate a command to adjust the charging current of the battery 120 to be about 0 A and provide the generated command to the charger and the charger may then be configured to temporarily stop the charging of the battery 120. The controller 150 may be configured to provide or output a discharging signal to the motor driver 140 to operate the motor to enable the battery 120 to discharge a greater current (e.g., greater than 0 A).

The controller 150 may be configured to charge the battery 120 again in response to confirming that the discharging of the battery 120 is completed by the motor or the discharging time of the battery 120 by the motor exceeds the threshold time. The discharging time may by the time when the falling of SoC by the motor is less than about 1%. Accordingly, when the temperature of the battery is equal to or greater than the threshold value while the battery is charging at a substantially low temperature, the battery may be discharged, and thus polarization occurring during the charging of the battery may be removed. In particular, the polarization may be removed and then the battery may be charged again, and as a result, the temperature of the battery may increase and then a substantially constant current (CC) section may be increased during the charging, thereby reducing the charging time.

Figure 2:
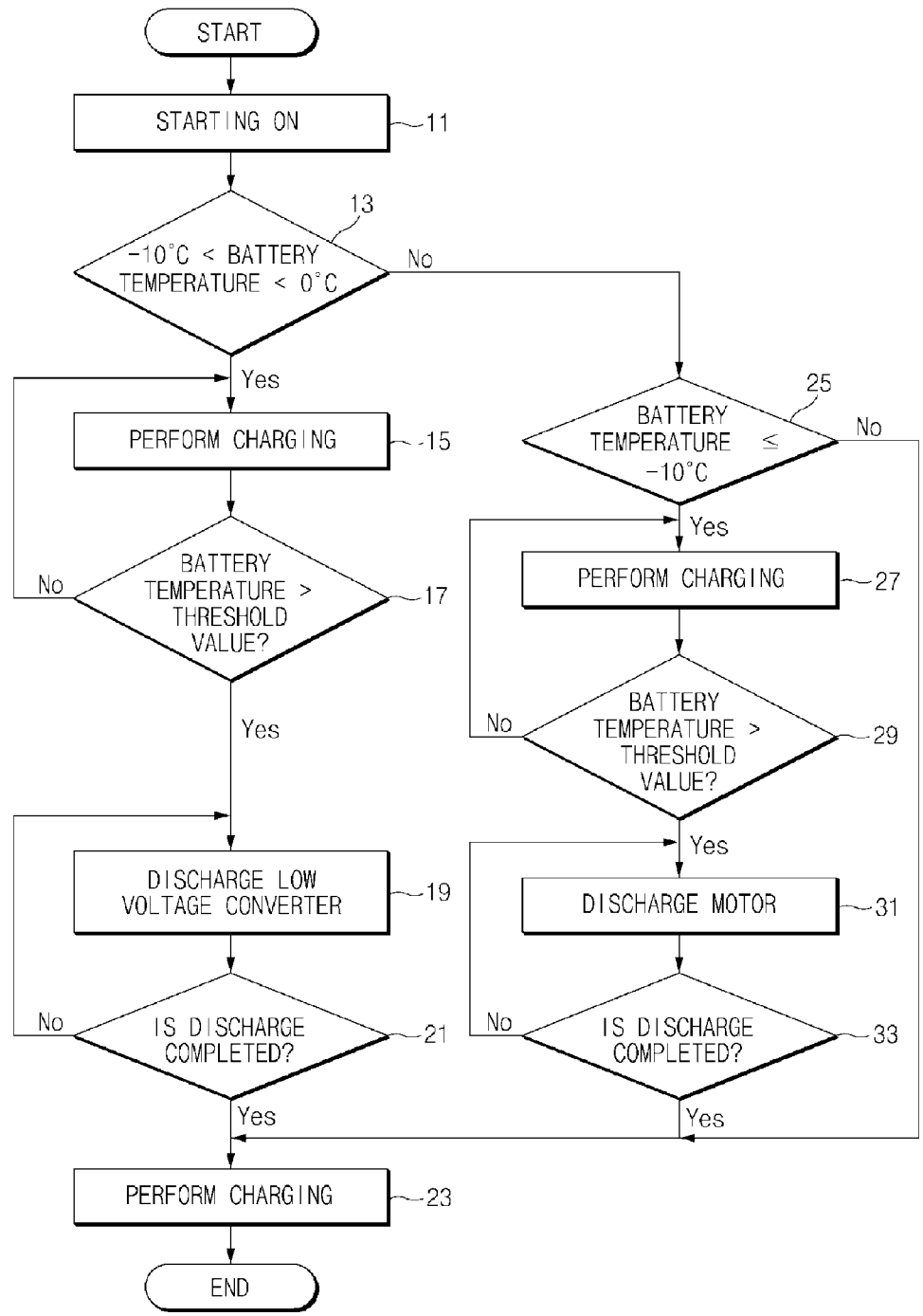
FIG. 2 is an exemplary flow chart for describing a battery charging method of electric vehicle according to an exemplary embodiment of the present disclosure.

FIG. 2 is an exemplary flow chart for describing a battery charging method of electric vehicle according to an exemplary embodiment of the present disclosure. Referring to FIGS. 1 and 2, in step 11, the controller 150 may be configured to sense the starting of the vehicle and perform step 13. In step 13, the controller 150 may be configured to operate the temperature sensor 110 to confirm the temperature of the battery 120 and confirm whether the temperature of the battery 120 ranges from the first threshold temperature, for example, about −10° C. to the second threshold temperature, for example, about 0° C. As the confirmation result of step 13, when the temperature of the battery 120 ranges from about −10° C. to 0° C., the controller 150 may perform step 15 when the temperature of the battery 120 does not range from about −10° C. to 0° C., the controller 150 may perform step 25.

In step 15, the controller 150 may be configured to charge the battery 120. In step 17, the controller 150 may be configured to continuously confirm the temperature of the battery 120 which is charging to perform step 19 when the temperature of the battery exceeds the threshold value. In step 17, the controller 150 may return a process to step 15 when the temperature of the battery does not exceed (e.g., is less than) the threshold value to charge the battery 120. In particular, the threshold value may be temperature which is about room temperature. In step 19, the controller 150 may be configured to operate the low voltage converter 130 to discharge the battery 120. Specifically, the controller 150 may be configured to temporarily stop the charging of the battery 120 based on the command to adjust the charging current of the battery 120 to be about 0 A.

In step 21, the controller 150 may perform step 23 in response to confirming that the discharging of the battery 120 is completed by the low voltage converter 130 and may return the process to step 19 in response to confirming that the discharging of the battery 120 is not completed to thus be configured to continuously perform the discharging of the battery 120 by operating the low voltage converter 130. In particular, in step 21, the controller 150 may be configured to confirm that the discharging of the battery 120 is completed using the low voltage converter 130, but the present disclosure is not necessarily limited thereto. The controller 150 may perform step 23 when the discharging time of the battery 120 exceeds the threshold time using the low voltage converter 130 and then may return the process to step 19 when the discharging time of the battery 120 does not exceed the threshold time. In step 23, the controller 150 may be configured to charge the battery 120.

Further, the controller 150 may be configured to confirm whether the temperature of the battery 120 is equal to or less than the first threshold temperature, for example, about −10° C. in step 25 when the temperature of the battery 120 does not range from about −10° C. to 0° C. As the confirmation result of step 25, when the temperature of the battery 120 is equal to or less than about −10° C., the controller 150 may perform step 27 and when the temperature of the battery 120 is not equal to or less than about −10° C., for example, when the temperature of the battery 120 is equal to or greater than about 0° C., the controller 150 may perform step 23.

In step 27, the controller 150 may be configured to charge the battery 120. In step 29, the controller 150 may be configured to continuously confirm the temperature of the battery 120 which is charging to perform step 31 when the temperature of the battery exceeds the threshold value. In step 29, the controller 150 may return the process to step 27 when the temperature of the battery does not exceed the threshold value to charge the battery 120.

In step 31, the controller 150 may be configured to operate the motor driver 140 to discharge the battery 120 using the motor (not illustrated) mounted within the vehicle. Particularly, the controller 150 may be configured to temporarily stop the charging of the battery 120 based on the command to adjust the charging current of the battery 120 to be about 0 A.

In step 33, the controller 150 may perform step 23 in response to confirming that the discharging of the battery 120 is completed by the motor and may return the process to step 31 in response to confirming that the discharging of the battery 120 is not completed to be configured to continuously perform the discharging of the battery 120 using the motor. In step 33, the controller 150 is configured to confirm that the discharging of the battery 120 is completed, but the present disclosure is not necessarily limited thereto. The controller 150 may perform step 23 in response to determining that the discharging time of the battery 120 exceeds the threshold time and return the process to step 31 in response to determining that the discharging time of the battery 120 does not exceed the threshold time.

As described above, according to the exemplary embodiments of the present disclosure, it may be possible to reduce the charging time of the battery during the low temperature and improve the marketability of the electric vehicle, by discharging the battery using at least one of the low voltage converter and the motor during the low temperature and then again charging the battery.

The exemplary embodiments of the present disclosure disclosed in the present specification and the accompanying drawings have been provided only as specific examples to assist in understanding the present disclosure and do not limit the scope of the present disclosure. Therefore, it is to be understood that in addition to the exemplary embodiments of the present disclosure described herein, all the changed or modified forms derived from the technical spirit of the present disclosure are included in the scope of the present disclosure.

What is claimed is:

1. A battery charging apparatus of electric vehicle, comprising:
    a temperature sensor configured to sense a temperature of a battery; and
    a controller configured to discharge the battery and then charge the battery using any one of a low voltage converter and a motor based on the temperature,
    wherein the controller is configured to discharge the battery using the low voltage converter when the temperature of the battery ranges from a first threshold temperature to a second threshold temperature.

2. The battery charging apparatus of electric vehicle according to claim 1, wherein the controller is configured to discharge the battery using the motor when the temperature of the battery is equal to or less than a first threshold temperature.

3. The battery charging apparatus of electric vehicle according to claim 1, wherein the controller is configured to charge the battery when a discharging time of the battery exceeds a threshold time.

4. The battery charging apparatus of electric vehicle according to claim 1, wherein the controller is configured to charge the battery when the discharging of the battery is completed.

5. A battery charging method of electric vehicle, comprising:

confirming, by a controller, a temperature of a battery mounted within a vehicle using a temperature sensor;

discharging, by the controller, the battery using any one of a low voltage converter and a motor based on the temperature;

discharging, by the controller, of the battery using the low voltage converter when the temperature of the battery ranges from a first threshold temperature to a second threshold temperature; and charging, by the controller, the battery.

6. The battery charging method of electric vehicle according to claim 5, wherein the discharging of the battery includes:

discharging, by the controller, of the battery using the motor when the temperature of the battery is equal to or less than a first threshold temperature.

7. The battery charging method of electric vehicle according to claim 5, wherein the charging of the battery includes:

confirming, by the controller, a discharging time of the battery and charging of the battery when the discharging time of the battery exceeds a threshold time.

8. The battery charging method of electric vehicle according to claim 5, wherein the charging of the battery includes:

confirming, by the controller, a discharging completion of the battery and charging of the battery when the discharging completion of the battery is confirmed.

* * * * *